United States Patent Office 3,312,646
Patented Apr. 4, 1967

3,312,646
COPOLYMERS HAVING PENDANT SUBSTITUTED AMIDE RADICALS
Joseph A. Vasta, Woodbury, N.J., assignor to E. I. du Pont de Nemours and Company, Wilmington, Del., a corporation of Delaware
No Drawing. Filed May 23, 1966, Ser. No. 551,936
12 Claims. (Cl. 260—22)

This application is a continuation-in-part of application Serial No. 290,313, filed June 25, 1963.

This invention relates to thermosetting addition copolymers.

It is more particularly directed to thermosetting polymers of monoethylenically unsaturated monomers, the polymers bearing pendant amido groups having hydrogen atoms replaced with groups of the formula

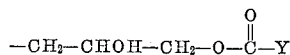

or

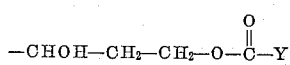

where Y is an aliphatic hydrocarbon radical of 4 through 18 carbon atoms.

These polymers are useful as film-forming ingredients in thermosetting coating compositions which are especially suited for finishing appliances such as refrigerators, washing machines, ranges and the like. These finishes show excellent resistance to alkali, detergents, grease, chemical fumes, and food and drug stains. They also show superior heat-, mar- and abrasion resistance. Coating compositions having these polymers as film-formers can be cured at customary baking temperature without sacrificing these advantageous properties.

In addition, the polymers are highly compatible with alkyd resins. When the two are used together, one can obtain coating compositions showing improved adhesion, recoatability without sanding, and greatly enhanced heat resistance, grease resistance, and hardness.

Preparation of polymers

The polymers of the invention can be made by first preparing a "backbone" polymer having pendant amido groups. Illustrative of the monoethylenically unsaturated monomers which can be used in preparing a backbone polymer are styrene, vinyl toluene, and the esters of maleic, fumaric, itaconic, crotonic, acrylic and methacrylic acids with alkanols of 1–12 carbon atoms. The pendant amido groups are introduced during the backbone's formation by using one or more comonomers containing an amino group. Illustrative of these comonomers are alkyl acrylamides whose alkyl groups contain 1–5 carbon atoms, such as acrylamide, methacrylamide, itaconic diamide and crotonamide. These comonomers will constitute about 1 through 30 percent of the backbone polymers total weight.

The selection of monomers used in preparing these backbone polymers will be determined by the physical properties desired of the final product and the type of coating composition to be made from it. For example, if low cost coating compositions for interior use are to be made, compositions which do not require a high degree of durability, the backbone polymer can be composed principally of styrene units. On the other hand, if it is desired to make compositions suitable for exterior use where durability is a factor, the backbone polymer can be composed mainly of methylmethacrylate units.

Needless to say, any balance of properties can be obtained by varying the number and kind of monomers and the relative proportions in which they are used. The physical nature of the final polymers can also be varied by manipulating reaction conditions and catalysts within operable limits. All this is well known in the polymer art and can be done by anyone versed in polymer chemistry.

Preferred for the excellence of the finishes obtained when they are used as film-forming components in coating compositions are backbone copolymers of styrene, ethyl acrylate and acrylamide. Particularly preferred for the same reason is a styrene/ethyl acrylate/acrylamide backbone copolymer whose monomer unit weight proportions are 40/44/16, respectively.

The backbone polymer is then reacted with a gylcidyl ester represented by the formula (1) 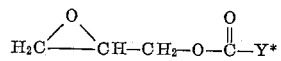

where Y is an aliphatic hydrocarbon radical of 4 through 18 carbon atoms.

Preferred for the acid and alkali resistance of the finishes obtained when they are used are glycidyl esters of Formula 1 where Y is a tertiary group represented by the formula

where $R_1$ is —$CH_3$ and $R_2$ and $R_3$ are lower alkyl groups, $R_1$, $R_2$ and $R_3$ containing a total of 79 carbon atoms. Such an ester is sold by the Shell Chemical Co. as "Cardura" E ester.

From all of this, it will be seen that polymers of the invention preferred for the excellence of the finishes obtained when they are used as film-forming components in coating compositions are styrene/ethyl acrylate/acrylamide backbone copolymers esterfied with "Cardura" E ester. Especially preferred is a styrene/ethyl acrylate/acrylamide copolymer whose monomer unit weight proportions are 40/44/16, respectively, esterified with "Cardura" E ester to give a styrene/ethyl acrylate/esterified acrylamide copolymer whose monomer unit weight proportions are 25/28/47, respectively.

Polymerization of the monomers to form a polymeric backbone can be carried out according to customary procedures by admixing suitable monomers, in proportions selected to impart the desired physical properties to the product, dissolved in such inert solvents as xylene, toluene, methyl ethyl ketone or butyl alcohol.

A polymerization catalyst is then added to this mixture. Suitable for use are such catalysts as tertiary butyl peroxide, cumene hydroperoxide, and azobisbutyronitrile. The catalyst should be present in the reaction mass at a concentration of 0.1%–4% by weight of the monomers present.

This mixture is then refluxed until its viscosity is constant, which usually takes from 6 to 12 hours.

To this reaction mixture is then added the proper amount of a glycidyl ester reactant. Normally one uses a mole of glycidyl ester for each mole of amido groups in the backbone polymer, but less can be used to give a partially esterified backbone, or more can be used to give a polymer whose amido groups have two esterified hydrogen atoms. Also added is 0.05%–3%, by weight of the backbone polymer, of an esterification catalyst such as triethylamine, which is used to decrease reaction time and to obtain consistently high yields.

This mixture is then refluxed until its viscosity remains

---
*Those glycidyl esters of this type which cannot be bought can be made according to methods shown in "Glycidyl Esters. (II) Synthesis of Esters of Commercial and Pure Fatty Acids" by Maerker, et al., Journal of American Oil Chemists Society, 38, 194 (1960).

constant, which ordinarily takes 2 to 4 hours. The solid impurities are then filtered off, giving a clear solution of a polymer of the invention.

This solution is suitable for direct use in the preparation of coating compositions. If the pure polymer is desired, it can be obtained by simply stripping the solvent from the solution, leaving behind a solid mass of polymer whose physical properties can range from resinous to crystalline, depending on the monomers, their respective proportions and the reaction conditions used.

*Preparation of coating compositions*

Coating compositions can be prepared using the polymers of this invention by blending them with customary pigments and liquid carriers such as aromatic naphthas, ketones, and alcohols, and such adjuncts as plasticizers and fillers. This blending is accomplished by such customary procedures as sand-grinding or ball-milling the polymer, a pigment and a liquid carrier to form a mill-base, and then blending in the other components. Such compositions will ordinarily contain from 5 to 90% of the polymers of the invention.

The coating compositions of this invention can be enhanced with respect to resulting film quality by adding from 10 through 70%, by weight of the polymer solids, of aminoplast resins such as urea-formaldehyde, melamine-formaldehyde or benzoguanamine-formaldehyde resins.

The costs of the compositions can also be significantly reduced without sacrificing film quality by adding from 5%–40% by weight of the polymer solids of an alkyd resin. As used here, "alkyd resin" means a polyester of a dibasic acid such as phthalic acid or phthalic anhydride, or a monobasic acid such as cocoanut oil acid, with a polyol such as glycerine.

Keeping all this in mind, it will be apparent that the characteristics of the coating compositions can be varied over wide ranges by judicious selection of monomers and reaction conditions used in preparing the polymers of the invention, and by selective use of aminoplast resins and alkyd resins in conjunction with these polymers.

EXAMPLES

This invention will be better understood by referring to the following illustrative examples:

EXAMPLE 1

First portion: Parts by weight
   Butanol _____ 844.2
   Styrene _____ 438.7
   Ethylacrylate _____ 488.3
   Acrylamide _____ 179.7
   Dodecylmercaptan _____ 11.0

Second portion:
   Cumene hydroperoxide _____ 6.0
   Butanol _____ 19.5

Third portion:
   t-Butylperacetate _____ 6.7
   Butanol _____ 17.7

Fourth portion:
   "Cardura" E ester _____ 636.9
   Triethylamine _____ 25.1
   Xylol _____ 25.1

Fifth portion:
   Xylol _____ 1122.0

The first portion is charged to a reaction vessel and heated to 100° C.

Heating is stopped and the second portion is added. After the exothermic reaction has subsided, the mixture is heated to reflux and held at that temperature for two hours.

The third portion is then added and the mixture refluxed for an additional four hours.

The ingredients of the fourth portion are premixed. Heating of the reactor is stopped and portion four is added over a thirty-minute period. The material is again heated to reflux temperature and held there until the polymer content of the solution is about 50%. Heating of the reaction mixture is stopped and portion five is added, with stirring.

This gives a polymer, in solution, having an empirical composition of

Parts
Styrene _____ 25
Ethyl acrylate _____ 28
Esterified acrylamide _____ 47
                                            100

EXAMPLE 2

First portion: Parts by weight
   Polymer of Example 1—45% solids _____ 107.56
   Butanol _____ 34.5
   High solvency petroleum naphtha _____ 18.5
   Industrial xylol—10° C. range _____ 24.0
   Titanium dioxide _____ 286.3

Second portion:
   Polymer of Example 1—45% solids _____ 379.05

Third portion:
   Melamine-formaldehyde resin solution—
     60% in butanol _____ 189.5

Fourth portion:
   Butanol _____ 24.6
   Industrial xylol _____ 10.3

The ingredients of the first portion are premixed and ground in a sand-mill. The second portion is then added to the first portion, with stirring. The third and fourth portions are then similarly added, in succession, and thoroughly blended to give a homogeneous composition.

The resulting enamel is reduced to hand spray viscosity with 20 to 30 parts by weight of industrial xylol, applied directly to metal, and baked for 30 minutes at 300° F.

The resulting finish is glossy, hard and heat resistant, and shows good metal adhesion.

The cost of this enamel can be significantly reduced, with only a slight reduction in heat resistance, by replacing half of the polymer with an equal weight of a 55% dehydrated castor oil alkyd resin solution (40% oil length resin in 90% high solvency naphtha, 5% xylol, 5% butanol).

EXAMPLE 3

First portion: Parts by weight
   Xylene _____ 546.00
   "Cardura" E _____ 840.00

Second portion:
   Butyl cellosolve _____ 848.75
   Acrylamide _____ 154.00
   Styrene _____ 1050.00
   Di-tertiary-butylperoxide _____ 17.50

Third portion:
   Triethylamine _____ 8.75
   Xylene _____ 35.00

The first portion is charged to a reaction vessel and heated to reflux temperature.

The ingredients of the second portion are mixed and the mixture is added to the refluxing first portion over a period of two hours. This is then held at reflux temperature for an additional two hours.

The third portion is then added and the mixture is held at reflux temperature until its viscosity remains constant.

This gives a polymer, in solution, having an empirical composition of

| | Parts |
|---|---|
| Styrene | 60 |
| Esterified acrylamide | 40 |
| | 100 |

EXAMPLE 4

The reactants in the following tables can be used, in the listed amounts, in place of those used in Example 3, and can be processed as in Example 3, to give the indicated products:

(A)

| | Parts |
|---|---|
| Methyl methacrylate | 525 |
| Butyl methacrylate | 490 |
| Methacrylamide | 157.5 |
| "Cardura" E ester | 577.5 |

The resulting polymer, in solution, will have an empirical composition of

| | Parts |
|---|---|
| Methyl methacrylate | 30 |
| Butyl methacrylate | 28 |
| Esterified methacrylamide | 42 |
| | 100 |

(B)

| | Parts |
|---|---|
| Styrene | 1067.5 |
| Acrylamide | 122.5 |
| Glycidyl oleate | 533.0 |

The resulting polymer, in solution, will have an empirical composition of

| | Parts |
|---|---|
| Styrene | 61 |
| Esterified acrylamide | 39 |
| | 100 |

(C)

| | Parts |
|---|---|
| Styrene | 1382.5 |
| Acrylamide | 122.5 |
| Glycidyl pivalate | 245.0 |

The resulting polymer, in solution, will have an empirical composition of

| | Parts |
|---|---|
| Styrene | 79 |
| Esterified acrylamide | 21 |
| | 100 |

Any of the polymer solutions of Examples 3 or 4 can be used to prepare coating compositions in the manner described in Example 2. These coating compositions, when applied, will give results similar to those obtained with the compositions of Example 2. Aminoplast resins and alkyd resins can be blended with these coating compositions, as in Example 2, with similar results.

What is claimed is:

1. A thermosetting polymer of monoethylenically unsaturated monomers, said polymer bearing pendant amido groups having hydrogen atoms replaced with a radical selected from the group consisting of

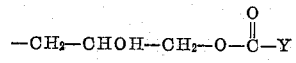

and

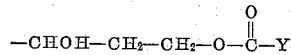

where Y is an aliphatic hydrocarbon radical of 4 through 18 carbon atoms.

2. A polymer according to claim 1 wherein Y is a radical of the structure

where $R_1$ is —$CH_3$ and $R_2$ and $R_3$ are lower alkyl groups, $R_1$, $R_2$ and $R_3$ containing a total of 7–9 carbon atoms.

3. A polymer according to claim 1 wherein the monomers are styrene, ethyl acrylate and acrylamide.

4. A polymer according to claim 3 wherein the monomer unit weight proportions are 25/28/47, respectively.

5. A coating composition comprising from 5% through 90% (by weight) of a polymer according to claim 1, a liquid carrier, and from 10% through 70% (by weight of the polymer solids) of an aminoplast resin.

6. A coating composition comprising from 5% through 90% (by weight) of a polymer according to claim 2, a liquid carrier, and from 10% through 70% (by weight of the polymer solids) of an aminoplast resin.

7. A coating composition comprising from 5% through 90% (by weight) of a polymer according to claim 3, a liquid carrier, and from 10% through 70% (by weight of the polymer solids) of an aminoplast resin.

8. A coating composition comprising from 5% through 90% (by weight) of a polymer according to claim 4, a liquid carrier, and from 10% through 70% (by weight of the polymer solids) of an aminoplast resin.

9. A coating composition comprising from 5% through 90% (by weight) of a polymer according to claim 1, a liquid carrier, and from 5% through 40% (by weight of the polymer solids) of an alkyd resin.

10. A coating composition comprising from 5% through 90% (by weight) of a polymer according to claim 2, a liquid carrier, and from 5% through 40% (by weight of the polymer solids) of an alkyd resin.

11. A coating composition comprising from 5% through 90% (by weight) of a polymer according to claim 3, a liquid carrier, and from 5% through 40% (by weight of the polymer solids) of an alkyd resin.

12. A coating composition comprising from 5% through 90% (by weight) of a polymer according to claim 4, a liquid carrier, and from 5% through 40% (by weight of the polymer solids) of an alkyd resin.

References Cited by the Examiner

UNITED STATES PATENTS

| 2,923,653 | 2/1960 | Maltin et al. | 260—853 |
| 2,940,943 | 6/1960 | Christenson et al. | 260—80.5 |
| 3,002,959 | 10/1961 | Hicks | 260—78.5 |
| 3,159,612 | 12/1964 | Tsou et al. | 260—89.7 |

MURRAY TILLMAN, *Primary Examiner.*

J. C. BLEUTGE, *Assistant Examiner.*